United States Patent
Burch

(10) Patent No.: US 7,089,467 B2
(45) Date of Patent: Aug. 8, 2006

(54) ASYNCHRONOUS DEBUG INTERFACE

(75) Inventor: Kenneth R. Burch, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 881 days.

(21) Appl. No.: 10/225,058

(22) Filed: Aug. 21, 2002

(65) Prior Publication Data

US 2004/0039963 A1   Feb. 26, 2004

(51) Int. Cl.
*G01R 31/28* (2006.01)

(52) U.S. Cl. .................... 714/724; 714/742

(58) Field of Classification Search ........... 714/724, 714/745, 28, 742; 713/733; 712/227
See application file for complete search history.

(56) References Cited

U.S. PATENT DOCUMENTS

| | | | | |
|---|---|---|---|---|
| 5,949,797 A | * | 9/1999 | Jung | 714/724 |
| 5,991,910 A | * | 11/1999 | Hull et al. | 714/733 |
| 6,564,351 B1 | * | 5/2003 | Loughmiller | 714/745 |
| 6,658,612 B1 | * | 12/2003 | Park et al. | 714/724 |
| 6,915,416 B1 | * | 7/2005 | Deng et al. | 712/227 |
| 6,944,794 B1 | * | 9/2005 | Okabayashi et al. | 714/28 |

* cited by examiner

*Primary Examiner*—David Ton
(74) *Attorney, Agent, or Firm*—Fulbright & Jaworski LLP

(57) ABSTRACT

Apparatus and methods are described for a background microcontroller debugger. A method to debug a microcontroller includes sending a three level signal from a debug module, receiving the three level signal at a single pin on an MCU, sending a second three level signal from the single pin on the MCU, and receiving the second three level signal at the debug module. An apparatus to debug a microcontroller includes a tri-statable pad driver to transmit a three level signal, a reference voltage divider coupled to the tri-statable pad diver, a plurality of voltage comparators to receive the three level signal, a resistive voltage divider to maintain thresholds for the plurality of voltage comparators, and a plurality of logic elements coupled to the plurality of voltage comparators to receive the three level signal.

19 Claims, 2 Drawing Sheets

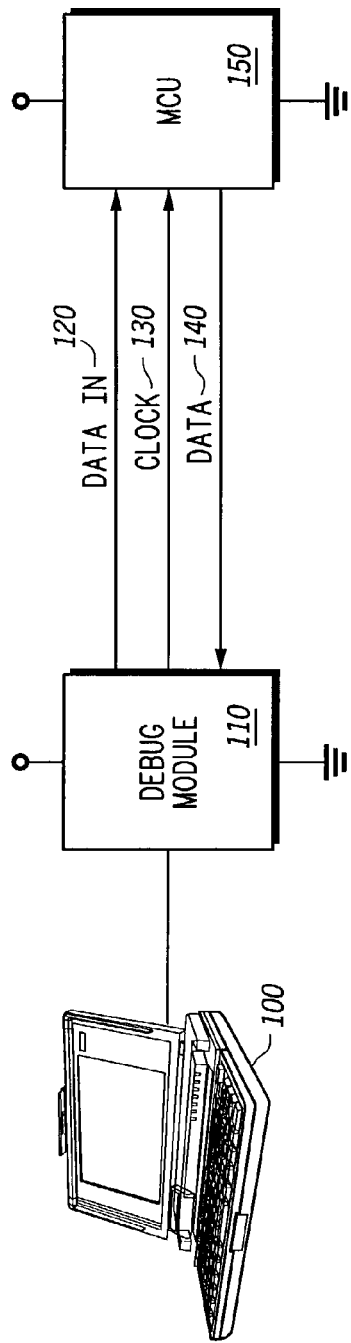
FIG.1 –PRIOR ART–
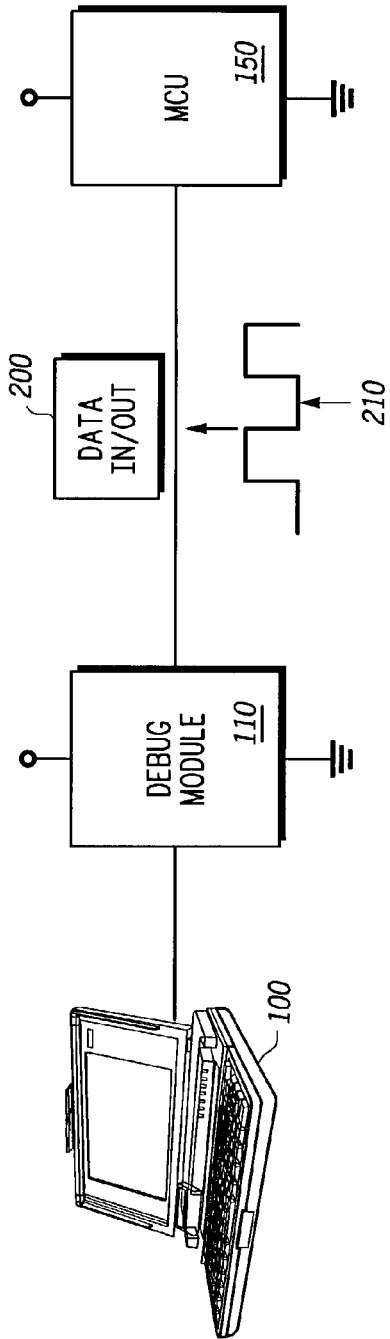
FIG.2 –PRIOR ART–

ASYNCHRONOUS DEBUG INTERFACE

BACKGROUND OF THE INVENTION

1. Field of the Invention

The invention relates generally to the field of microcontrollers. More particularly, the invention relates to debug interfaces for microcontrollers.

2. Discussion of the Related Art

Background debug, which aids in the development of software in microcontrollers (MCUs), has been in existence since about 1990 and has grown in sophistication. Debug is essential for the software development of most modern MCUs. It usually utilizes a synchronous serial data protocol.

As shown in FIG. 1, a control device, such as a computer 100, is linked to a debug module 110 to debug the software in the MCU 150. A "data in" signal 120 and a clock signal 130 are sent simultaneously from the debug module 110 to the MCU 150, and a data signal 140 is sent back to the debug module 110 from the MCU 150. This data signal 140 is analyzed to detect and correct possible problems in the software in the MCU 150.

FIG. 2 illustrates a system where only one wire is used to communicate in a half-duplex manner between the MCU and the debug module 110, thereby maintaining low costs. Signal waveform 210 of the data in/out signals 200 is illustrated. As directed by the computer 100, the debug module 110 sends and receives from the MCU 150 a binary or bi-level waveform 210. However, because a clock signal is not embedded in the data signal, both the MCU 150 and the debug module 110 needs to receive clock information from another source or the information transmitted between the debug module 110 and the MCU 150 is useless.

As the performance of MCUs increases and the cost simultaneously decreases, it is increasingly necessary to put software debug logic on-chip. In future generations of low cost MCUs, the pin count may be so low that only a single pin may be reserved for use as a debug port. This becomes a problem as IC designers never know what frequency a customer might use, and a clocking signal is important to keep the two modules synchronized.

One example of current technology is a system that is implemented with on-chip hardware rather than external software and provides a full set of debugging options. The control logic resides in an on-chip background debug module (BDM), rather than in a CPU. The BDM generally uses CPU dead cycles to execute debugging commands while the CPU is operating normally but can steal cycles from the CPU when necessary. While the BDM is active, the CPU executes a monitor program located in a small on-chip ROM.

Debugging control logic communicates with external devices serially, via single pin. This single-wire approach helps to minimize the number of pins needed for development support. This pin is an open-drain pin that can be driven either by an MCU or by an external host and is used to send and receive data only. The BDM and the MCU both have their own clocks. However, problems arise when the clock in the BDM becomes out of sync with the clock in the MCU. If this situation arises, the BDM cannot effectively detect any problems that may be present. Thus, synchronization of the MCU and the debug module, without dedicated data, clock, and handshake signals, is a fundamental problem.

SUMMARY OF THE INVENTION

There is a need for the following embodiments. Of course, the invention is not limited to these embodiments.

According to an aspect of the invention, a method to debug a microcontroller comprises sending a three level signal from a debug module, receiving the three level signal at a single pin on an MCU, sending a second three level signal from the single pin on the MCU, and receiving the second three level signal at the debug module.

According to another aspect of the invention, an apparatus to debug a microcontroller comprises a tri-statable pad driver to transmit a three level signal, a resistive voltage divider coupled to the tri-statable pad diver, a plurality of voltage comparators to receive the three level signal, a reference voltage divider to maintain thresholds for the plurality of voltage comparators, and a plurality of logic elements coupled to the plurality of voltage comparators to receive the three level signal.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation.

BRIEF DESCRIPTION OF THE DRAWINGS

The drawings accompanying and forming part of this specification are included to depict certain aspects of the invention. It should be noted that the features illustrated in the drawings are not necessarily drawn to scale.

FIG. 1 illustrates an example of a prior art debug interface.

FIG. 2 illustrates an example of a prior art bi-directional signal sent to and from the debug interface via a single wire.

DESCRIPTION OF PREFERRED EMBODIMENTS

The invention and the various features and advantageous details thereof are explained more fully with reference to the nonlimiting embodiments that are illustrated in the accompanying drawings and detailed in the following description.

The invention can include a background debug interface for use with microcontroller units. The invention can also include the use of a tri-state waveform.

A practical application of the invention that has value within the technological arts is that it can be used to debug most low cost MCUs. It is not limited to asynchronous logic and is only a small incremental cost from the debugging mechanisms currently in use.

An asynchronous debug module, representing an embodiment of the invention, can be cost effective and advantageous. The invention eliminates a problem that the clock of a MCU and debug module must be synchronized even when the clock of the MCU is variable or unknown. (i.e. a PLL (phase locked loop) is used). According to an embodiment of the invention, a clock signal is combined with a data signal. The receiver in either the MCU or the debug module receives this combined signal at a proper rate because the combined signal is now self-clocked. This solution for an asynchronous debug module is much more robust. It does not depend on a particular clock rate or clock rate ratio, so it is truly asynchronous. Unlike previous designs, this solution may use only a single pin on the MCU. Thus, die/package costs may be kept low.

Figure 3:
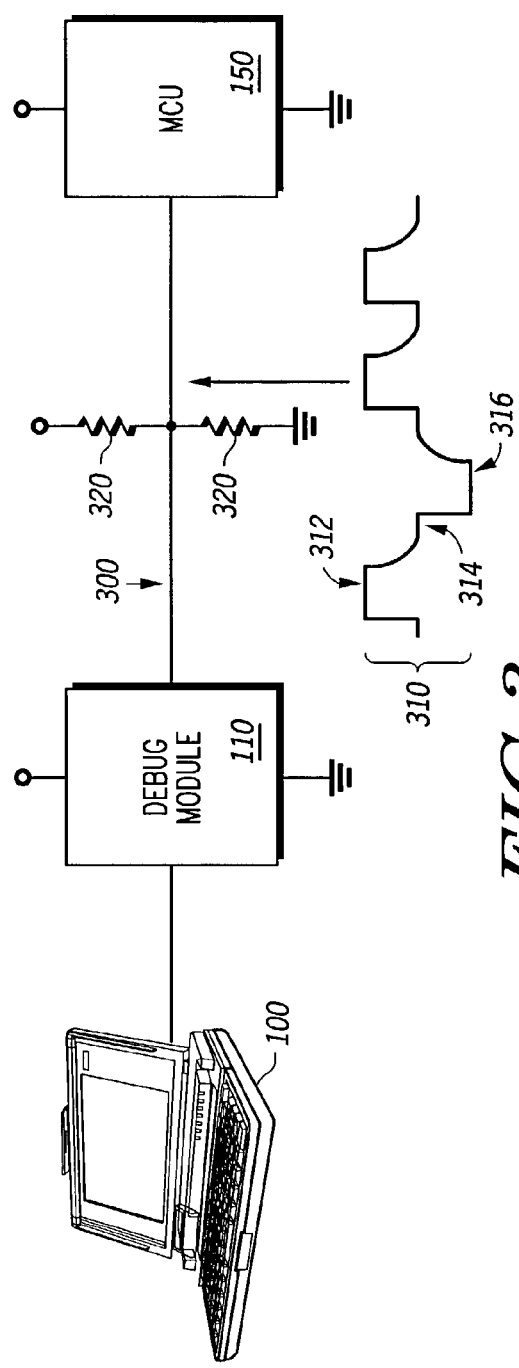
FIG. 3 illustrates the signals transmitted by an embodiment of the invention.

Unlike conventional binary logic used in the debugging of MCUs, one embodiment of the invention involves a one-wire interface that uses a three-level signal 310 sent to and from a single pin 300 in a debug module 110 and an MCU 150, as shown in FIG. 3. These three levels have been labeled +1 (312), 0 (314), and −1 (316). This labeling is in accord with binary logic. However, since there is no negative voltage supply present (the three voltages, in one embodiment, are $V_{DD}$, $V_{DD}/2$, and $V_{SS}$), the three states may be labeled as 1 (312), mid (314), and 0 (316).

Figure 4:
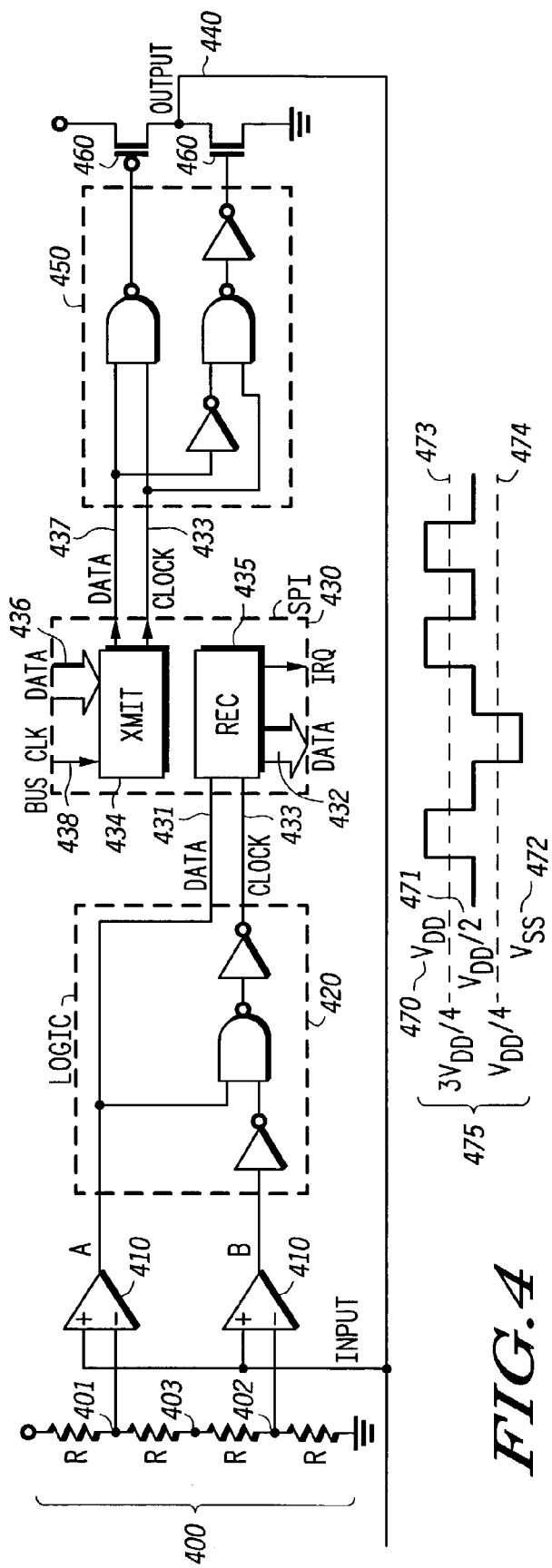
FIG. 4 illustrates a hardware implementation of an embodiment of the invention.

The three-state waveform 310 may be translated to/from an ordinary SPI (serial peripheral interface) within the MCU 150 and also within the debug module 110 after translation via the comparator circuit 410 shown in FIG. 4. Thus, a single wire 300 may be used to communicate both a clock and data in a way that does not depend on the clock rate being synchronized.

The transmitter of the signal 310 may be a "tri-statable" pad driver where the "mid" state is simply a high impedance mode, which allows the resistive voltage divider 320 to create a $V_{DD}/2$ (or mid) voltage.

FIG. 4 shows an example of an embodiment of a receiver and transmitter, both of which may be found in both the MCU 150 and the debug module 110. The receiver may include two (voltage) comparators 410 and logic elements 420. The logic elements are for processing the signal from the comparators and may be a combination of various logic gates as needed for the desired signals, such as a NAND gate and two NOT gates. These logic elements 420 combine the outputs of the comparators 410, process the outputs, and output the clock 433 and data 431 signals which are fed to the receive register 435 in the SPI 430. Table 1 shows how the output of clock and data elements by the logic elements 410 is determined from its inputs that come from the comparators 410.

TABLE 1

| input | data | clock |
|---|---|---|
| "mid" | 0 | 0 |
| "0" | 0 | 1 |
| "mid" | 1 | 0 |
| "1" | 1 | 1 |

The comparators 410 may constantly compare their input signals (which would be the output signal 440 from another similar module that is received via the single pin/wire 300) with the reference voltages created by the resistors present in a voltage divider 400. The signal 475 shown in FIG. 4 is an example of a signal that may be received by the comparators. It is shown in an ideal form where $V_{DD}$ 470 indicates a logical 1, $V_{DD}/2$ 471 indicates a mid, and $V_{SS}$ 472 indicates a logical 0. However, in actual application, the signals are not so clearly defined and voltage thresholds may be defined to extract information from the signal.

The comparators 410 obtains these values by comparing the incoming signal to the reference voltages obtained from the reference voltage divider 400. The negative input into comparator A 410A is connected to the point at the voltage divider which produces a voltage of $3V_{DD}/4$ 401. The negative input into comparator B 410B is connected to the point at the voltage divider which produces a voltage of $V_{DD}/4$ 402. $V_{DD}/2$ is obtained from the point in the middle 403 of the voltage divider 400.

Therefore, if the incoming signal input into the comparators 410, when compared with the reference voltages obtained from the reference voltage divider 400, is at a level at or above $3V_{DD}/4$ 473, then a logical 1 is assumed. A logical 0 is obtained when the signal 475 reaches a level at or below $V_{DD}/4$ 474, and the signal is in the mid state when it has a value between $V_{DD}/4$ 474 and $3V_{DD}/4$ 473. $V_{DD}/4$, $V_{DD}/2$, and $3V_{DD}/4$ are exemplary threshold values. Any series of tri-level voltage values may be used at the discretion of the designer by changing the values of the resistors in the reference voltage divider 400.

The signals pass from the logic elements 420 to the SPI 430. The SPI 430 may comprise two shift registers, one for transmitting data 434 and the other for receiving data 435, with a few additional storage bits to indicate when a message has been sent or received. The data in 431 and out 432, IRQ (interrupt request, labeled as "IRQ" in FIG. 4), clock 433, and bus clock 438 are all part of the interface between the SPI 430 and the remainder of the MCU 150.

To create a three level signal at the output 440 of the transmitter (output 440 is sent along single pin/wire 300 of FIG. 3) from 1's and 0's, MOSFETs 460 are used. The clock signal 433 and the data signal 432 are both fed into the MOSFETs 460. In one embodiment of the invention, as shown in Table 2, both the N-channel MOSFET 8 and P-channel MOSFET 460 are turned off and the output signal 440 is at mid 471 when the clock signal 433 has a value of 0. When the clock signal 433 has a value of 1, the output 440 may be either 1 (470) or 0 (472), depending on the data signal 437. For the output signal 440 to be at 1 (470), the data signal 437 is at 1 and the P-channel MOSFET 460 is turned on. For the output signal 440 to be at 0 (472), the N-channel MOSFET 460 is turned on. If there is no communication between the debug module 110 and the MCU 150, both of the MOSFETs 460 are turned off.

TABLE 2

| data | clock | P-ch | N-ch | output |
|---|---|---|---|---|
| 0 | 0 | off | off | "mid" |
| 0 | 1 | off | on | "0" |
| 1 | 0 | off | off | "mid" |
| 1 | 1 | on | off | "1" |

With the addition of a third comparator (not shown) to logic elements 450, one may provide an active driver to the mid state. This third comparator (not shown), coupled to the $V_{DD}/2$ tap 403 of the reference voltage divider 400 and logic elements 450, enables one to turn on a N-channel MOSFET to drive the voltage 475 towards 0 (472) and shutting the N-channel MOSFET off as the voltage 475 reaches mid (471). Similarly, the third comparator (not shown), coupled to the $V_{DD}/2$ tap 403 of the reference voltage divider 400, enables one to turn on a P-channel MOSFET to actively drive the voltage 475 towards 1 (470) and shutting the P-channel MOSFET off as the voltage 475 approaches mid (471).

Another way to actively drive the voltage to mid is to turn both MOSFETs 460 on and off. The resistive voltage divider 320 may be required, but only to sustain mid (471) when no other device is actively driving the debug bus. When using this approach, it is important that the sum of the internal propagation delays be much less than the output driver's transition time. Otherwise, output signals may overlap with the end of the previous signal in the receiver, thereby distorting the signal. One such signal 310 is shown in FIG. 3.

The signal 310 is shown to transition slowly, in an exponential form, from 1 (312) to mid (314) and from 0 (316) to mid (314), which would cause distortion problems. As mentioned previously, this can be avoided by quickly turning both of the MOSFETs 460 on and then off to greatly reduce the transition time, which would snap the voltage to mid (314). For this method to be effective, though, a pair of carefully matched MOSFETs should be used, wherein matched indicates that the on resistance of one MOSFET is approximately equal to the on resistance of the second MOSFET.

The output signal 440 may be shown in an ideal form as the signal 475 where $V_{DD}$ 470 indicates a logical 1, $V_{DD}/2$ 471 indicates a mid and $V_{SS}$ 472 indicates a logical 0. However, in actual application and as described previously for the incoming signal input to the comparators, if the signal 475 reaches a level above $3V_{DD}/4$ 473, then a logical 1 is indicated. A logical 0 is reached when the signal 475 reaches a level below $V_{DD}/4$ 474, and the signal is in the mid state when it has a value between $V_{DD}/4$ 474 and $3V_{DD}/4$ 473.

When the debug interface 110 is not in use, the debug pin on the MCU 150 should be pulled low or high and not simply allowed to "float". This is because there could possibly be a conflict at Power On Reset (POR) if the debug interface's output driver is enabled and pulling to the opposite state. The problem can be eliminated by using a pull-down/up resistor as is known in the art, but this adds another component to the hardware implementation. If possible, this debug pin should be disabled when not in use.

To achieve the debug function, this disclosure may make use of various data transmission protocols to communicate between the MCU and the debug module.

For a well defined debug protocol which utilizes the debug module described earlier, some peripheral concerns may arise, such as the sending/receiving SPI being of a known length. If the length is unknown, the debug module cannot be programmed accordingly and may output erroneous results. In addition, it is necessary to synchronize the SPI with the MCU or the debug module. One way to accomplish this is via the traditional Motorola MCU IRQ (interrupt request) system (i.e., wait for 8-bits to be received and then generate an IRQ). A reserved 8-bit word is needed for an acknowledge message, which can be sent back via software mechanisms. Hardware can also be added to handle this automatically.

Embodiments of the invention described above address the asynchronous debug interface between ICs. It alone does not focus on any asynchronous problems between the SPI and CPU, the solutions to which are well-known in the art. One such solution may be to simply have the MCU send back an acknowledge to the debug module each time it receives a command.

The terms a or an, as used herein, are defined as one or more than one. The term plurality, as used herein, is defined as two or more than two. The term another, as used herein, is defined as at least a second or more. The term approximately, as used herein, is defined as at least close to a given value (e.g., preferably within 10% of, more preferably within 1% of, and most preferably within 0.1% of). The terms including and/or having, as used herein, are defined as comprising (i.e., open language). The phrase any integer derivable therein, as used herein, is defined as an integer between the corresponding numbers recited in the specification, and the phrase any range derivable therein is defined as any range within such corresponding numbers.

What is claimed is:

1. A method to debug a microcontroller, comprising:
sending a three level signal from a debug module;
receiving the three level signal at a single pin on an MCU;
sending a second three level signal from the single pin on the MCU; and
receiving the second three level signal at the debug module.

2. The method of claim 1, wherein the three levels of the three level signal are 1, mid, and 0.

3. The method of claim 2, wherein a N-channel MOSFET is used to drive the three level signal towards 0 and stops the signal at mid.

4. The method of claim 2, wherein a P-channel MOSFET is used to drive the three level signal towards 1 and stops the signal at mid.

5. The method of claim 1, wherein the single pin is pulled low or high when debugging is not taking place.

6. The method of claim 1, wherein the single pin is disabled when not in use.

7. An apparatus to debug a microcontroller, comprising:
a tri-statable pad driver to transmit a three level signal;
a resistive voltage divider coupled to the tri-statable pad diver;
a plurality of voltage comparators to receive the three level signal;
a reference voltage divider to maintain a signal threshold of the three level signal; and
a plurality of logic elements coupled to the plurality of voltage comparators to receive the three level signal.

8. An integrated circuit having the apparatus of claim 7.

9. The apparatus of claim 8, wherein the tri-statable pad driver transmits the three level signal from a single pin.

10. The apparatus of claim 7, wherein the three levels of the three level signal are 1, mid, and 0.

11. The apparatus of claim 7, wherein the resistive voltage divider sustains mid when no device other than a debug module is actively driving the debug bus.

12. The apparatus of claim 7, further comprising means for minimizing a signal transit time.

13. The apparatus of claim 7, wherein the reference voltage divider comprises a $V_{DD}/2$ tap.

14. The apparatus of claim 7, further comprising an additional voltage comparator and a second plurality of logic elements that are coupled to the $V_{DD}/2$ tap of the reference voltage divider.

15. The method of claim 14, wherein the additional voltage comparator enables a N-channel MOSFET to drive the three level signal towards 0 and to stop the signal at mid.

16. The method of claim 14, wherein the additional voltage comparator enables a P-channel MOSFET to drive the three level signal towards 1 and to stop the signal at mid.

17. The apparatus of claim 7, further comprising a pull-down/up resistor.

18. The apparatus of claim 17, wherein the pull-down/up resistor pulls a single pin high or low.

19. An apparatus to debug a microcontroller, comprising:
means for transmitting a three level signal;
means for receiving the three level signal; and
means for debugging the microcontroller using the three level signal.

* * * * *

UNITED STATES PATENT AND TRADEMARK OFFICE
CERTIFICATE OF CORRECTION

PATENT NO. : 7,089,467 B2 Page 1 of 1
APPLICATION NO. : 10/225058
DATED : August 8, 2006
INVENTOR(S) : Kenneth R. Burch It is certified that error appears in the above-identified patent and that said Letters Patent is hereby corrected as shown below:

In the Title Page, item [57], Abstract, line 10, please delete "diver" and insert --driver--.

In claim 7, column 6, line 27, please delete "diver" and insert --driver--.

In claim 11, column 6, line 41, please delete "the debug bus" and insert --a debug bus--.

In claim 14, column 6, line 46, please delete "claim 7" and insert --claim 13--.

Signed and Sealed this

Twenty-ninth Day of April, 2008

JON W. DUDAS
*Director of the United States Patent and Trademark Office*